(12) United States Patent
Sato et al.

(10) Patent No.: US 11,254,573 B2
(45) Date of Patent: Feb. 22, 2022

(54) LITHIUM ION-CONDUCTING SOLID ELECTROLYTE AND SOLID-STATE LITHIUM ION RECHARGEABLE BATTERY

(71) Applicant: TDK CORPORATION, Tokyo (JP)

(72) Inventors: Hiroshi Sato, Tokyo (JP); Masahiro Oishi, Tokyo (JP); Taisuke Masuko, Tokyo (JP); Tomohiro Yano, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 21 days.

(21) Appl. No.: 16/337,173

(22) PCT Filed: Sep. 25, 2017

(86) PCT No.: PCT/JP2017/034510
§ 371 (c)(1),
(2) Date: Mar. 27, 2019

(87) PCT Pub. No.: WO2018/062092
PCT Pub. Date: Apr. 5, 2018

(65) Prior Publication Data
US 2020/0031670 A1    Jan. 30, 2020

(30) Foreign Application Priority Data
Sep. 29, 2016    (JP) .............................. JP2016-192082

(51) Int. Cl.
*C01B 25/45* (2006.01)
*H01M 10/0562* (2010.01)

(52) U.S. Cl.
CPC ......... *C01B 25/45* (2013.01); *H01M 10/0562* (2013.01); *C01P 2002/85* (2013.01); *C01P 2004/03* (2013.01); *C01P 2006/40* (2013.01); *H01M 2300/0068* (2013.01)

(58) Field of Classification Search
CPC ..... H01M 10/0562; H01M 2300/0068; H01M 2300/0071; C01B 25/45
See application file for complete search history.

(56) References Cited

U.S. PATENT DOCUMENTS

| 2014/0038058 | A1 | 2/2014 | Holzapfel et al. |
| 2015/0333366 | A1 | 11/2015 | Sato et al. |
| 2016/0248120 | A1* | 8/2016 | Yamada ............ H01M 10/0562 |

FOREIGN PATENT DOCUMENTS

| CN | 103443968 A | 12/2013 |
| JP | 2014-511335 A | 5/2014 |
| JP | 2015-065021 A | 4/2015 |
| JP | 2016-001595 A | 1/2016 |
| JP | 2016-031782 A | 3/2016 |
| WO | 2013/100000 A1 | 7/2013 |
| WO | 2013/128759 A1 | 9/2013 |

OTHER PUBLICATIONS

Oct. 31, 2017 International Search Report issued in International Patent Application No. PCT/JP2017/034510.

* cited by examiner

*Primary Examiner* — Stephan J Essex
(74) *Attorney, Agent, or Firm* — Oliff PLC

(57) ABSTRACT

A lithium ion-conducting solid electrolyte containing at least one metallic element selected from the group made of Zn, Ca, Mg, and Cu within a range of 0.01% by mass to 3.0% by mass, and a solid-state lithium ion rechargeable battery containing this lithium ion-conducting solid electrolyte.

10 Claims, 3 Drawing Sheets

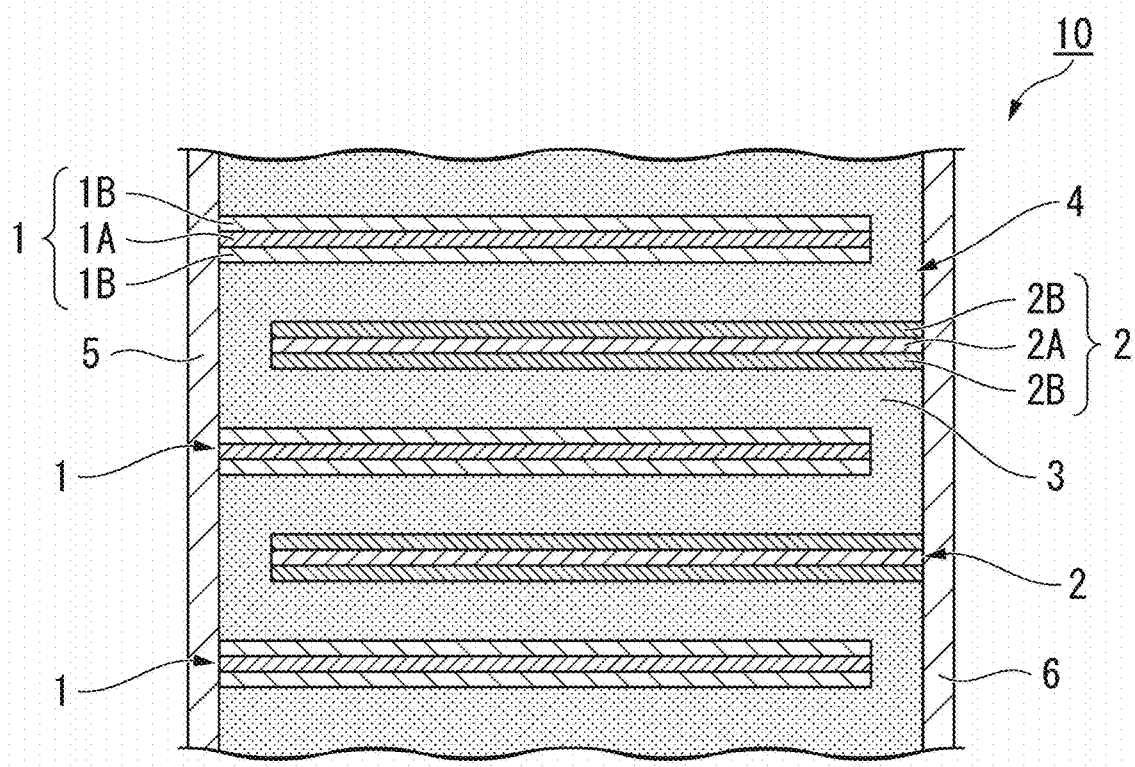

LITHIUM ION-CONDUCTING SOLID ELECTROLYTE AND SOLID-STATE LITHIUM ION RECHARGEABLE BATTERY

TECHNICAL FIELD

The present disclosure relates to a lithium ion-conducting solid electrolyte and a solid-state lithium ion rechargeable battery.

Priority is claimed on Japanese Patent Application No. 2016-192082, filed Sep. 29, 2016, the content of which is incorporated herein by reference.

BACKGROUND ART

Lithium ion rechargeable batteries are widely used as power sources for small portable devices such as mobile phones, notebook PCs, or PDAs. Lithium ion rechargeable batteries used in such small portable devices are required to be made smaller, thinner, and more reliable.

As lithium ion rechargeable batteries, a battery in which an organic electrolytic solution is used as an electrolyte, and a battery in which a solid electrolyte is used as an electrolyte are known. A lithium ion rechargeable battery in which a solid electrolyte is used as an electrolyte (solid-state lithium ion rechargeable battery) is advantageous in that a battery is easily reduced in size and thinned because a degree of freedom in designing a battery shape is high, and reliability is high because leakage or the like of an electrolytic solution does not occur, as compared with a lithium ion rechargeable battery in which an organic electrolytic solution is used.

As a material for a solid electrolyte of a solid-state lithium ion rechargeable battery, a compound having a polyanion, particularly a compound having a NASICON-type crystal structure, has been studied. For example, Patent Literature 1 discloses a solid-state lithium ion rechargeable battery formed of lithium aluminum titanium phosphate (LATP) having a NASICON-type crystal structure as a solid electrolyte.

Meanwhile, solid electrolytes generally have lower lithium ion conductivity than organic electrolytic solutions. For this reason, solid-state lithium ion rechargeable batteries have a problem that an internal resistance is high and an output current is low, as compared with lithium ion rechargeable batteries formed of an organic electrolytic solution. Accordingly, in solid-state lithium ion rechargeable batteries, a solid electrolyte is required to have improved lithium ion conductivity.

Patent Literature 2 discloses a solid-state lithium ion rechargeable battery in which a solid electrolyte layer contains a first component composed of a lithium-containing oxide; and a second component composed of a compound containing at least one element selected from the group consisting of magnesium, calcium, barium, and strontium. A lithium-containing phosphoric acid compound having a NASICON-type structure is disclosed as the first component, and an oxide or a phosphoric acid compound is disclosed as the second component. According to Patent Literature 2, the solid electrolyte layer is constituted by adding the second component to the first component functioning as a solid electrolyte whereby it is possible to improve denseness of the solid electrolyte layer after sintering and improve ionic conductance.

CITATION LIST

Patent Literature

[Patent Literature 1]
Japanese Unexamined Patent Application, First Publication No. 2016-1595 (A)
[Patent Literature 2]
PCT International Publication No. WO2013/100000 (A)

SUMMARY OF INVENTION

Technical Problem

However, in the solid-state lithium ion rechargeable battery disclosed in Patent Literature 2, the second component contained in the solid electrolyte layer does not have lithium ion conductivity. For this reason, when the second component is unevenly distributed in the solid electrolyte layer and a contact area between the first component pieces is reduced, conversely, lithium ion conductivity of the solid electrolyte layer may be reduced, and thus an internal resistance of the solid-state lithium ion rechargeable battery may increase.

The present disclosure has been made in view of the above problems, and an object thereof is to provide a lithium ion-conducting solid electrolyte with improved lithium ion conductivity. Another object of the present disclosure is to provide a solid-state lithium ion rechargeable battery with reduced internal resistance.

Solution to Problem

The inventors of the present disclosure have found that, when a lithium ion-conducting solid electrolyte contains at least one metallic element selected from the group consisting of Zn, Ca, Mg, and Cu within a predetermined range, it is possible to significantly improve lithium ion conductivity and improve denseness of the solid electrolyte after sintering. The inventors of the present disclosure have further conducted investigation and confirmed that, when a lithium ion-conducting solid electrolyte containing a metallic element such as Zn, Ca, Mg, and Cu is used, it is possible to reduce an internal resistance of a solid-state lithium ion rechargeable battery, and therefore have completed the present disclosure.

Accordingly, the present disclosure provides the following means to solve the above problem.

(1) A lithium ion-conducting solid electrolyte according to one aspect of the present disclosure contains at least one metallic element selected from the group consisting of Zn, Ca, Mg, and Cu within a range of 0.01% by mass to 3.0% by mass.

(2) In the lithium ion-conducting solid electrolyte described in (1), a content of the metallic element may be within a range of 0.05% by mass to 2.0% by mass.

(3) The lithium ion-conducting solid electrolyte described in (1) or (2), may further contain Li within a range of 1.0% by mass to 2.5% by mass, Al within a range of 0.1% by mass to 3.0% by mass, Ti within a range of 15.0% by mass to 35.0% by mass, and P within a range of 15.0% by mass to 35.0% by mass.

(4) In the lithium ion-conducting solid electrolyte described in (3), a content of Li may be within a range of 1.4% by mass to 2.0% by mass, a content of Al may be within a range of 0.3% by mass to 1.5% by mass, a content of Ti may be within a range of 20.0% by mass to 28.0% by mass, and a content of P may be within a range of 20.0% by mass to 30.0% by mass.

(5) The lithium ion-conducting solid electrolyte described in any one of (1) to (4), may be a compound having a polyanion.

(6) The lithium ion-conducting solid electrolyte described in (5) may have the same crystal structure as a compound having a NASICON-type crystal structure.

(7) In the lithium ion-conducting solid electrolyte described in (6), the compound having the NASICON-type crystal structure may be lithium titanium phosphate.

(8) A solid-state lithium ion rechargeable battery according to one aspect of the present disclosure contains the lithium ion-conducting solid electrolyte according to any one of (1) to (7).

(9) In the solid-state lithium ion rechargeable battery according to any one of (1) to (8), a relative density between a pair of electrode layers and a solid electrolyte layer provided between the pair of electrode layers may be 80% or more.

Advantageous Effects of Invention

According to the lithium ion-conducting solid electrolyte according to one aspect of the present disclosure, lithium ion conductivity is improved. In addition, according to the solid-state lithium ion rechargeable battery according to one aspect of the present disclosure, an internal resistance is low and an output current is high.

BRIEF DESCRIPTION OF DRAWINGS

FIG. 1 is a cross-sectional schematic view showing an enlarged main part of a solid-state lithium ion rechargeable battery according to one embodiment of the present disclosure.

DESCRIPTION OF EMBODIMENTS

Figure 2A:
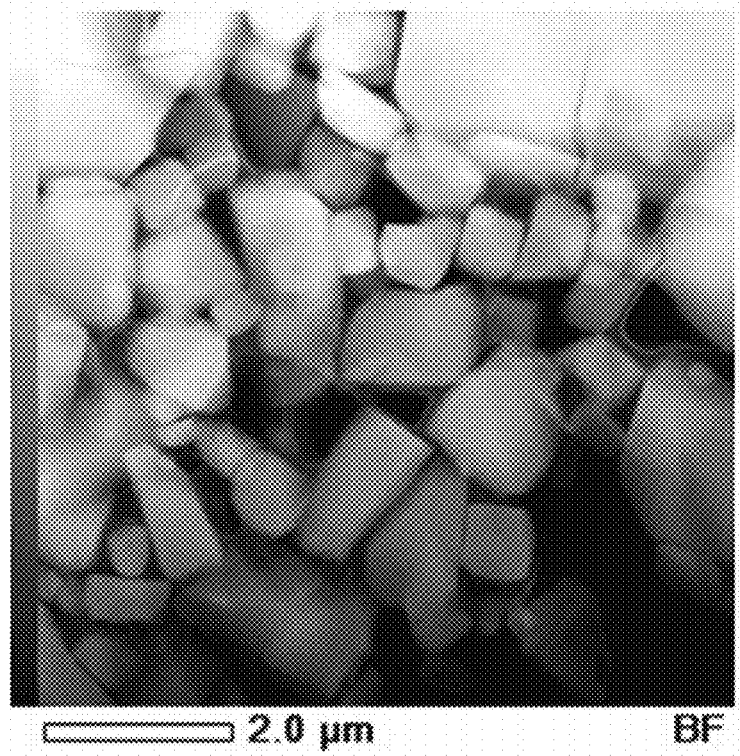
FIG. 2A shows an SEM-EDS elemental mapping of a solid electrolyte powder which is obtained in Example 1-4 (BF).
Figure 2B:
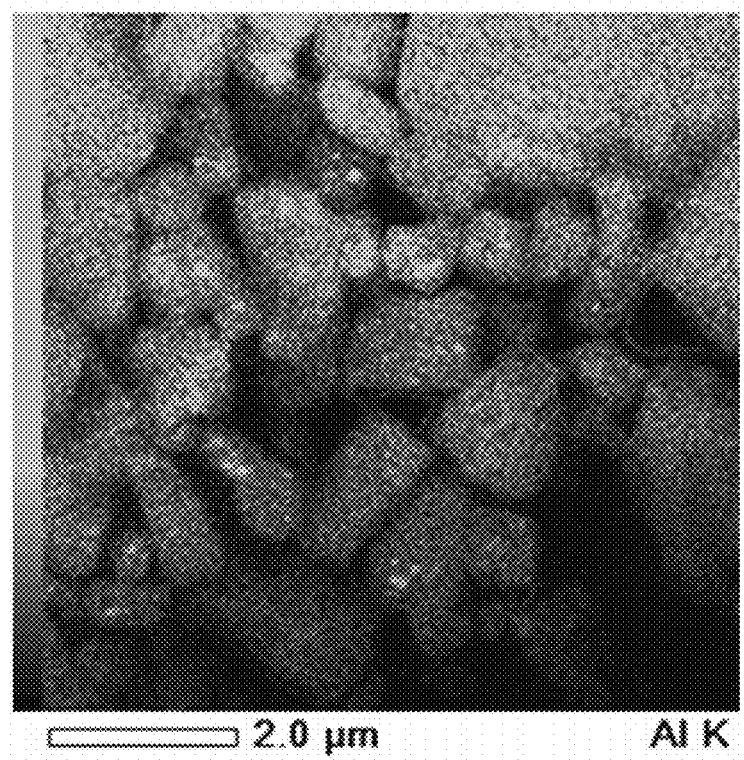
FIG. 2B shows an SEM-EDS elemental mapping of a solid electrolyte powder which is obtained in Example 1-4 (AlK).
Figure 2C:
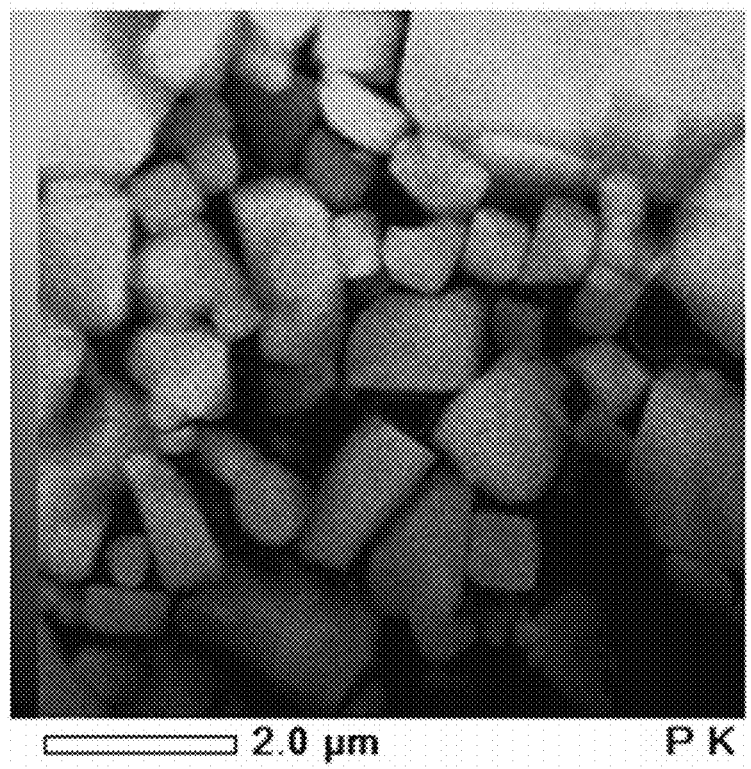
FIG. 2C shows an SEM-EDS elemental mapping of a solid electrolyte powder which is obtained in Example 1-4 (PK).
Figure 2D:
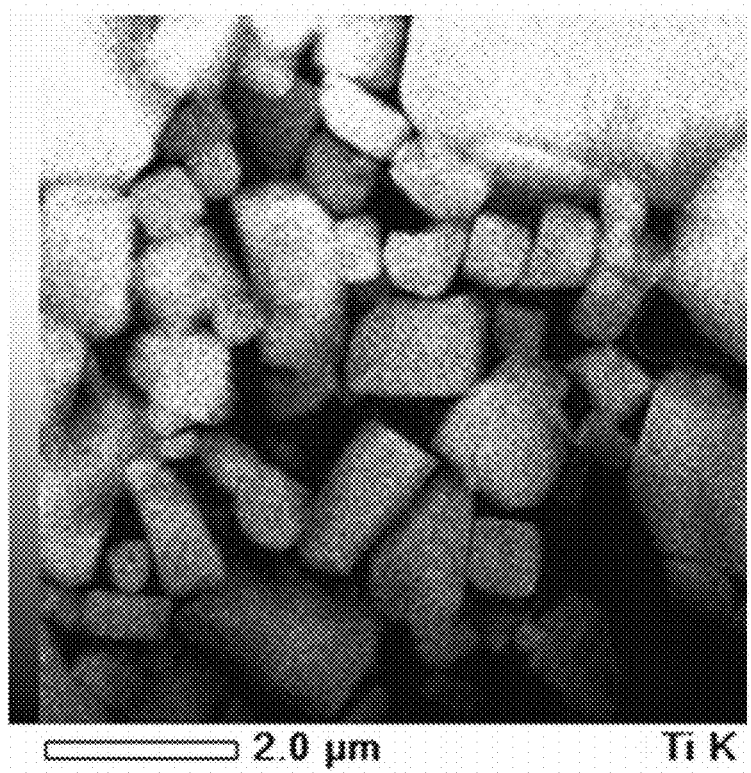
FIG. 2D shows an SEM-EDS elemental mapping of a solid electrolyte powder which is obtained in Example 1-4 (TiK).

Hereinafter, the present disclosure will be described in detail with reference to the drawings as appropriate. In the drawings used in the following description, main parts are shown in an enlarged manner in some cases for the sake of convenience in order to make the features of the present disclosure easy to understand, and dimensional ratios and the like between the components may be different from actual ratios. The materials, dimensions, and the like exemplified in the following description are merely examples, and the present disclosure is not limited thereto, and can be appropriately changed and modified to realize the present embodiment, within a range not changing the gist thereof.

[Lithium Ion-Conducting Solid Electrolyte]

A lithium ion-conducting solid electrolyte according to one embodiment of the present disclosure contains at least one metallic element (hereinafter referred to as "added metallic element") selected from the group consisting of Zn, Ca, Mg, and Cu. An added metallic element may be included singly or there may be a combination of two or more kinds thereof. A content of added metallic elements is within a range of 0.01% by mass or to 3.0% by mass, and is preferably within a range of 0.05% by mass to 2.0% by mass. In a case of two or more kinds of added metallic element being included, a content of added metallic elements is a total amount of these added metallic elements.

It is preferable that the added metallic elements be incorporated into a host crystal (a crystal component functioning as a solid electrolyte) of a lithium ion-conducting solid electrolyte. It is preferable that the added metallic elements substitute a metal constituting the host crystal of the lithium ion-conducting solid electrolyte. It is particularly preferable that the added metallic elements substitute a trivalent or tetravalent metal constituting the host crystal of the lithium ion-conducting solid electrolyte. In addition, it is preferable that the added metallic elements in a monovalent or divalent state, particularly in a divalent state, be incorporated into the host crystal. A fact that the added metallic elements have been incorporated into the host crystal of the lithium ion-conducting solid electrolyte can be confirmed from, for example, a content of the added metallic elements after bringing the lithium ion-conducting solid electrolyte into contact with an acid solution. That is, in a case where the added metallic elements are incorporated into the host crystal of the lithium ion-conducting solid electrolyte, if the lithium ion-conducting solid electrolyte is brought into contact with an acid solution, hardly any of the added metallic elements will be eluted. For example, an amount of added metallic elements eluted when a lithium ion-conducting solid electrolyte of the present embodiment is in contact with 1 mol/L hydrochloric acid for 1 hour, is 1% by mass or less with respect to the added metallic elements contained in a solid electrolyte powder.

The reason why the lithium ion-conducting solid electrolyte of the present embodiment has high lithium ion conductivity has not been elucidated, but is thought to be as follows. In other words, ionic conduction in a typical crystalline solid is generally explained by a model in which defect sites such as vacancies or lattice defects diffuse by hopping. Added metallic elements such as Zn, Ca, Mg, and Cu have highly ionic bonding properties, and therefore, by incorporation of these added metallic elements into the host crystal of the solid electrolyte, defect sites such as ionized vacancies and lattice defects with a negative charge are formed. When these defect sites are formed, lithium ion conductivity by hopping is improved.

In addition, the reason why the denseness of the lithium ion-conducting solid electrolyte of the present embodiment after sintering is improved is thought to be as follows. That is, sintering is a phenomenon in which, in a powder, due to the surface free energy of the powder as a driving force when heating, movement of a substance occurs due to volume diffusion, surface diffusion, grain boundary diffusion, and the like mediated by lattice defects, and therefore particles bond to each other to reduce a surface area, become dense, and are baked. In a lithium ion-conducting solid electrolyte of the present embodiment, since the movement of a substance easily occurs mediated by defect sites, the denseness after sintering is improved.

When a content of added metallic elements is too small, a sufficient number of defect sites may not be formed, and thus lithium ion conductivity and denseness after sintering may not be improved. On the other hand, when a content of added metallic elements is too large, a large amount of defect sites are formed, and thus lithium ion conductivity and denseness after sintering may decrease conversely. For this reason, in the present embodiment, a content of added metallic elements is set to be within the above-described ranges.

Examples of compounds forming the host crystal of the lithium ion-conducting solid electrolyte of the present embodiment include compounds containing Li, Al, Ti, or P. A content of Li is preferably within a range of 1.0% by mass to 2.5% by mass, and is particularly preferably within a range of 1.4% by mass to 2.0% by mass. A content of Al is preferably within a range of 0.1% by mass to 3.0% by mass, and is particularly preferably within a range of 0.3% by mass to 1.5% by mass. A content of Ti is preferably within a range of 15.0% by mass to 35.0% by mass, and is particularly preferably within a range of 20.0% by mass to 28.0% by mass. A content of P is preferably within a range of 15.0% by mass to 35.0% by mass, and is particularly preferably within a range of 20.0% by mass to 30.0% by mass.

In addition, examples of compounds forming the host crystal of the lithium ion-conducting solid electrolyte of the present embodiment include a polyanion compound having a polyanion. A polyanion compound is preferably a compound having $XO_4$ tetrahedra (X=P, S, As, Mo, W, Si) as a polyanion in the crystal structure thereof.

A polyanion compound is preferably a compound having an olivine-type crystal structure or a compound having a NASICON-type crystal structure.

Examples of the compounds having an olivine-type crystal structure include $LiFePO_4$, and $LiMdPO_4$ (Md=Mn, Co, Ni).

Examples of the compounds having a NASICON-type crystal structure include $LiMe_2(XO_4)_3$ (Me=transition metal, X=P, S, As, Mo, W, Si). It is more preferable that the compound having a NASICON-type crystal structure be lithium titanium phosphate: $LiTi_2(PO_4)_3$ (LTP) in which Me is Ti. Lithium titanium phosphate is preferably a metal-substituted lithium titanium phosphate: $Li_f Mf_g Ti_h P_i O_{12}$ (Mf=Al, Sc, In, Fe, Cr, Ga, Y, La; and f, g, h, and i are numbers satisfying $0.5 \leq f \leq 3.0$, $0.09 \leq g \leq 0.50$, $1.40 \leq h \leq 2.00$, and $2.80 \leq i \leq 3.20$, respectively), in which a part of Ti is substituted with another metal. Lithium aluminum titanium phosphate: $Li_f Al_g Ti_h P_i O_{12}$ (f, g, h, and i are numbers satisfying $0.5 \leq f \leq 3.0$, $0.09 \leq g \leq 0.50$, $1.40 \leq h \leq 2.00$, and $2.80 \leq i \leq 3.20$, respectively), in which Mf is Al is particularly preferable.

The lithium ion-conducting solid electrolyte of the present embodiment may be a compound containing Li, Al, Ti, and P within the above-mentioned ranges. In addition, the lithium ion-conducting solid electrolyte of the present embodiment may be a polyanion compound, which is a compound having the same crystal structure as a compound having a NASICON-type crystal structure (in particular, lithium titanium phosphate). Furthermore, the lithium ion-conducting solid electrolyte of the present embodiment may be a polyanion compound, which is a polyanion compound containing Li, Al, Ti, P within the above-mentioned ranges, which is a compound having the same crystal structure as a compound having a NASICON-type crystal structure (in particular, lithium titanium phosphate).

The lithium ion-conducting solid electrolyte of the present embodiment can be manufactured by, for example, a solid phase method or a heat-melting method.

The solid phase method is a method in which a powder mixture is obtained by mixing a powder of a compound of elements forming a host crystal of a lithium ion-conducting solid electrolyte with a powder of compounds of the added metallic elements, and the obtained powder mixture is then calcined.

For example, a lithium ion-conducting solid electrolyte compound having the same crystal structure as lithium aluminum titanium phosphate can be manufactured as follows. Firstly, $Li_2CO_3$ powder, $Al_2O_3$ powder, $TiO_2$ powder, $NH_4H_2PO_4$ powder, and a powder of compounds containing the added metallic elements are prepared as starting materials, these starting materials are mixed, and therefore a powder mixture is obtained. A mixing ratio between the starting materials is a proportion of added metallic elements within a range of 0.01% by mass to 3.0% by mass included in the generated lithium aluminum titanium phosphate. It is preferable to mix the starting materials while pulverizing them using a mixing device having a pulverizing function, such as a ball mill. Next, the obtained powder mixture is calcined. Calcination of the powder mixture is preferably carried out in air. A calcination temperature is preferably 800° C. A calcination time is preferably 2 hours. A lithium ion-conducting solid electrolyte compound generated by the calcination may be pulverized using pulverizing equipment. A ball mill can be used for the pulverizing equipment.

The heat-melting method is a method in which a powder mixture is obtained by mixing a powder of a compound of elements forming a host crystal of a lithium ion-conducting solid electrolyte with a powder of compounds of added metallic elements, the obtained powder mixture is heated so that a glass melt is generated, this glass melt is added dropwise into flowing water so that flake-like glass is obtained, and the glass thus obtained is heat-treated such that it crystallizes.

For example, a lithium ion-conducting solid electrolyte compound having the same crystal structure as lithium aluminum titanium phosphate can be manufactured as follows. Firstly, $Li_2CO_3$ powder, $Al_2O_3$ powder, $TiO_2$ powder, $H_3PO_4$ powder, and a powder of compounds of added metallic elements are prepared as starting materials, these starting materials are mixed, and therefore a powder mixture is obtained. A mixing ratio between the starting materials and a mixing device are the same as those in the case of the solid phase method. Next, the obtained powder mixture is put into a heat-resistant container such as a platinum pot and heated using an electric furnace so that a glass melt is generated. This glass melt is added dropwise into flowing water, and therefore flake-like glass is obtained. A heating temperature of the powder mixture is preferably 1500° C. A heating time is preferably 4 hours. Heating is preferably carried out while stirring. Next, the obtained glass is heat-treated such that it crystallizes. A temperature of the heat treatment is preferably 950° C. A time of the heat treatment is preferably 12 hours.

[Solid-State Lithium Ion Rechargeable Battery]

FIG. 1 is a cross-sectional schematic view showing an enlarged main part of a solid-state lithium ion rechargeable battery according to one embodiment of the present disclosure. As shown in FIG. 1, a solid-state lithium ion rechargeable battery 10 includes a laminated body 4 having first electrode layers 1, second electrode layers 2, and a solid electrolyte layer 3. A first electrode layer 1 and a second electrode layer 2 form a pair of electrodes.

Each of the first electrode layers 1 is connected to a first external terminal 5, and each of the second electrode layers 2 is connected to a second external terminal 6. The first external terminal 5 and the second external terminal 6 are electrical contact points with respect to the outside.

(Laminated Body)

The laminated body 4 has the first electrode layers 1, the second electrode layers 2, and the solid electrolyte layer 3. One of the first electrode layer 1 or the second electrode layer 2 functions as a positive electrode layer, and the other functions as a negative electrode layer. The polarity of the electrode layer changes depending on which polarity is connected to the external terminal. Hereinafter, in order to facilitate understanding, the first electrode layer 1 will be referred to as a positive electrode layer 1, and the second electrode layer 2 will be referred to as a negative electrode layer 2.

In the laminated body 4, the positive electrode layer 1 and the negative electrode layer 2 are alternately laminated via the solid electrolyte layer 3. The solid-state lithium ion rechargeable battery 10 is charged and discharged by lithium ions being exchanged between the positive electrode layer 1 and the negative electrode layer 2 via the solid electrolyte layer 3.

(Positive Electrode Layer and Negative Electrode Layer)

The positive electrode layer 1 has a positive electrode current collector layer 1A, and a positive electrode active material layer 1B containing a positive electrode active material. The negative electrode layer 2 has a negative electrode current collector layer 2A, and a negative electrode active material layer 2B containing a negative electrode active material.

(Current Collector Layer)

It is preferable that the positive electrode current collector layer 1A and the negative electrode current collector layer 2A have high electrical conductivity. For this reason, it is preferable that the positive electrode current collector layer 1A and the negative electrode current collector layer 2A contain a low resistance metal such as silver, palladium, gold, platinum, aluminum, copper, or nickel. Among these low resistance metals, copper hardly reacts with a positive electrode active material, a negative electrode active material, and a solid electrolyte. Accordingly, when the positive electrode current collector layer 1A and negative electrode current collector layer 2A which contain copper are used, it is possible to reduce an internal resistance of the solid-state lithium ion rechargeable battery 10 over a long period of time. Compositions of the positive electrode current collector layer 1A and the negative electrode current collector layer 2A may be the same as or different from each other.

The positive electrode current collector layer 1A and the negative electrode current collector layer 2A may contain a positive electrode active material and a negative electrode active material which will be described later, respectively. Contents of active materials in each current collector layer are not particularly limited as long as a layer functions as a current collector. For example, it is preferable that a volume ratio of the low resistance metal/positive electrode active material, or the low resistance metal/negative electrode active material be within a range of 90/10 to 70/30.

With the positive electrode current collector layer 1A and the negative electrode current collector layer 2A respectively contain the positive electrode active material and the negative electrode active material, adhesiveness between the positive electrode current collector layer 1A and the positive electrode active material layer 1B, and between the negative electrode current collector layer 2A and the negative electrode active material layer 2B is improved.

(Active Material Layer)

The positive electrode active material layer 1B is formed on one surface or both surfaces of the positive electrode current collector layer 1A. For example, there is no negative electrode layer 2 facing a positive electrode layer 1 which is located at the uppermost layer in a lamination direction of the solid-state lithium ion rechargeable battery 10. Accordingly, in the positive electrode layer 1 located at the uppermost layer of the solid-state lithium ion rechargeable battery 10, the positive electrode active material layer 1B may be provided only on one side which is a lower side in the lamination direction. The same applies to the negative electrode active material layer 2B as the positive electrode active material layer 1B and is formed on one or both surfaces of the negative electrode current collector layer 2A.

Each of the positive electrode active material layer 1B and the negative electrode active material layer 2B contains a positive electrode active material or a negative electrode active material which exchanges electrons with lithium ions. In addition, a conductive auxiliary agent or the like may be contained therein. It is preferable that lithium ions be efficiently inserted into and desorbed from the positive electrode active material and negative electrode active material.

Transition metal oxides and complex transition metal oxides are preferably used for the positive electrode active material and the negative electrode active material, for example. Specifically, it is possible to use a complex lithium manganese oxide $Li_2Mn_aMa_{1-a}O_3$ ($0.8 \le a \le 1$, Ma=Co, Ni), lithium cobalt oxide ($LiCoO_2$), lithium nickel oxide ($LiNiO_2$), a lithium manganese spinel ($LiMn_2O_4$), a complex metal oxide represented by the general formula: $LiNi_xCo_yMn_zO_2$ ($x+y+z=1$, $0 \le x \le 1$, $0 \le y \le 1$, $0 \le z \le 1$), a lithium vanadium compound ($LiV_2O_5$), olivine-type $LiMbPO_4$ (where Mb is one or more kinds of element selected from Co, Ni, Mn, Fe, Mg, Nb, Ti, Al, and Zr), lithium vanadium phosphate ($Li_3V_2(PO_4)_3$ or $LiVOPO_4$), a Li-rich solid-solution positive electrode represented by $Li_2MnO_3$—$LiMcO_2$ (Mc=Mn, Co, Ni), lithium titanate ($Li_4Ti_5O_{12}$), a complex metal oxide represented by $Li_sNi_tCo_uAl_vO_2$ ($0.9 \le s \le 1.3$, $0.9 \le t+u+v \le 1.1$), and the like.

In addition, the negative electrode active material and the positive electrode active material may be selected according to the solid electrolyte layer 3 to be described later. For example, in a case where $Li_fAl_gTi_hP_iO_{12}$ (f, g, h, and i are numbers satisfying $0.5 \le f \le 3.0$, $0.09 \le g \le 0.50$, $1.40 \le h \le 2.00$, and $2.80 \le i \le 3.20$, respectively) is used for the solid electrolyte layer 3, it is preferable to use one or both of $LiVOPO_4$ and $Li_3V_2(PO_4)_3$ for the positive electrode active material and the negative electrode active material. Bonding at an interface between the positive electrode active material layer 1B and the negative electrode active material layer 2B, and the solid electrolyte layer 3 then becomes strong. In addition, a contact area at an interface between the positive electrode active material layer 1B and negative electrode active material layer 2B, and the solid electrolyte 3 layer can be widened.

The active materials constituting the positive electrode active material layer 1B or the negative electrode active material layer 2B need not be clearly demarcated. By comparing the potentials of the two kinds of compound, it is possible to use a compound exhibited a nobler potential as the positive electrode active material, and to use a compound exhibiting a more base potential as a negative electrode active material.

(Solid Electrolyte Layer)

The solid electrolyte layer 3 is provided between the positive electrode layer 1 and the negative electrode layer 2. The solid electrolyte layer 3 contains the above-described lithium ion-conducting solid electrolyte. When the lithium ion-conducting solid electrolyte described above is contained, lithium ion conductivity of the solid electrolyte layer 3 increases, and therefore an internal resistance of the solid-state lithium ion rechargeable battery of the present embodiment is reduced.

(External Terminal)

It is preferable to use a material having high conductivity for the first external terminal 5 and the second external terminal 6 of the solid-state lithium ion rechargeable battery 10. For example, silver, gold, platinum, aluminum, copper, tin, and nickel can be used. The first external terminal 5 and the second external terminal 6 may be configured of the same material or may be configured of different materials. The external terminal may have a single layer or a plurality of layers.

(Protective Layer)

In addition, the solid-state lithium ion rechargeable battery 10 may have a protective layer on an outer periphery of the laminated body 4 for protecting the laminated body 4 and terminals electrically, physically, and chemically. It is preferable that a material constituting the protective layer have excellent insulation, durability, and moisture resistance, and be environmentally safe. For example, it is preferable to use glass, ceramics, thermosetting resins, or photocurable resins. One kind or a plurality of kinds may be used in combination as a material of the protective layer. In addition, the protective layer may be a single layer, but is preferably a plurality of layers. Among them, an organic-inorganic hybrid in which a thermosetting resin and a ceramic powder are mixed is particularly preferable.

(Method for Manufacturing Solid-State Lithium Ion Rechargeable Battery)

First, materials of each of the positive electrode current collector layer 1A, the positive electrode active material layer 1B, the positive electrode interlayer 1C, the solid electrolyte layer 3, the negative electrode interlayer 2C, the negative electrode active material layer 2B, and the negative electrode current collector layer 2A, which constitute the laminated body 4, are made into a paste.

A method for making a paste is not particularly limited. For example, powders of each material are mixed into a vehicle to obtain a paste. A vehicle is a generic name of a medium in a liquid phase. Vehicles generally include solvents, dispersants, and binders. According to such a method, a paste for the positive electrode current collector layer 1A, a paste for the positive electrode active material layer 1B, a paste for the solid electrolyte layer 3, a paste for the negative electrode active material layer 2B, and a paste for the negative electrode current collector layer 2A are produced.

Next, a green sheet is produced. The green sheet is obtained by applying the produced paste onto a substrate such as polyethylene terephthalate (PET) in a desired order, drying if necessary, and peeling off the substrate. A method for applying a paste is not particularly limited. For example, known methods such as screen printing, coating, transfer, or doctor blade can be adopted.

Each green sheet produced is piled up in a desired order and number of laminates. Alignment, cutting, and the like are performed if necessary to produce a green sheet laminated body. In a case of producing a parallel-type or series-parallel-type battery, it is preferable to perform alignment to pile up sheets so that an end surface of the positive electrode layer and an end surface of the negative electrode layer does not correspond to each other.

The green sheet laminated body may be produced by using a positive electrode unit and a negative electrode unit which will be described below.

A positive electrode unit is a unit in which the solid electrolyte layer 3, the positive electrode interlayer 1C, the positive electrode active material layer 1B, the positive electrode current collector layer 1A, and the positive electrode active material layer 1B, and the positive electrode interlayer 1C are laminated in this order. This positive electrode unit can be produced as follows. First, a paste for forming a solid electrolyte layer is formed into a sheet shape on a PET film by a doctor blade method and dried, and therefore the solid electrolyte layer 3 is formed. Next, a paste for forming a positive electrode interlayer is printed on the formed solid electrolyte layer 3 by screen printing and dried, and therefore the positive electrode interlayer 1C is formed. Next, a paste for the positive electrode active material layer 1B is printed on the formed positive electrode interlayer 1C and dried, and therefore the positive electrode active material layer 1B is formed.

Next, a paste for forming a positive electrode current collector is printed on the formed positive electrode active material layer 1B by screen printing and dried, and therefore the positive electrode current collector layer 1A is formed. Next, the paste for forming the positive electrode active material layer 1B is printed on the formed positive electrode current collector layer 1A again by screen printing and dried, and therefore the positive electrode active material layer 1B is formed. In addition, the paste for forming a positive electrode interlayer was printed on the positive electrode active material layer 1B again and dried, and therefore a positive electrode interlayer 1C was formed. Then, the PET film is peeled off to produce the positive electrode active material layer unit.

A negative electrode unit is a unit in which the solid electrolyte layer 3, the negative electrode interlayer 2C, the negative electrode active material layer 2B, the negative electrode current collector layer 2A, the negative electrode active material layer 2B, and the negative electrode interlayer 2C are laminated in this order. This negative electrode unit can be produced by forming the solid electrolyte layer 3, the negative electrode interlayer 2C, the negative electrode active material layer 2B, the negative electrode current collector layer 2A, the negative electrode active material layer 2B, and the negative electrode interlayer 2C in the same procedure as that of the above-described positive electrode unit.

The positive electrode unit and the negative electrode unit are laminated to produce a green sheet laminated body. In this case, lamination is carried out so that the solid electrolyte layer 3 of the positive electrode unit is in contact with the negative electrode interlayer 2C of the negative electrode unit, or the positive electrode interlayer 1C of the positive electrode unit is in contact with the solid electrolyte layer 3 of the negative electrode unit. Accordingly, the green sheet laminate is obtained, in which the positive electrode interlayer 1C, the positive electrode active material layer 1B, the positive electrode current collector layer 1A, the positive electrode active material layer 1B, the positive electrode interlayer 1C, the solid electrolyte layer 3, the negative electrode interlayer 2C, the negative electrode active material layer 2B, the negative electrode current collector layer 2A, the negative electrode active material layer 2B, the negative electrode interlayer 2C, and the solid electrolyte layer 3 are laminated in this order. Each unit is shifted to be piled up so that the positive electrode current collector layer 1A of the positive electrode unit extends toward only one end surface, and the negative electrode current collector layer 2A of the negative electrode unit extends toward only the other surface. A sheet for the solid electrolyte layer 3 having a predetermined thickness may be further piled up on both surfaces of the produced green sheet laminated body.

The produced green sheet laminated body is pressure-bonded at once. The pressure bonding is carried out while performing heating. A heating temperature is, for example, 40 to 95° C.

For example, the pressure-bonded green sheet laminated body is heated to 500° C. to 750° C. under a nitrogen, hydrogen, and steam atmosphere to perform debinding. Thereafter, heating to 600° C. to 1000° C. under a nitrogen, hydrogen, and steam atmosphere and sintering are performed to obtain a sintered body. A sintering time is, for example, 0.1 to 3 hours. Each of the positive electrode active material layer 1B, the positive electrode interlayer 1C, the negative electrode active material layer 2B, the negative electrode interlayer 2C, and the solid electrolyte layer 3 contain the same type of metallic element and have the same composition. Therefore, shrinkage accompanied by sintering at substantially the same temperature occurs, and each layer becomes denser and the inside of each layer is strongly bonded.

The sintered laminated body may be put into a cylindrical container together with an abrasive such as alumina to be subjected to barrel polishing. Accordingly, it is possible to chamfer corners of the laminated body. As another method, polishing may be performed by sand blasting. This method is preferable because only a specific portion can be cut.

(Formation of Terminal)

The first external terminal 5 and the second external terminal 6 are attached to the obtained sintered body. The first external terminal 5 and the second external terminal 6 are formed so as to be in electrical contact with the positive electrode current collector layer 1A and the negative electrode current collector layer 2A, respectively. For example, the terminals can be formed by using a known method such as a sputtering method, a dipping method, or a spray coating method for the positive electrode current collector layer 1A and the negative electrode current collector layer 2A which are exposed from a side surface of the sintered body. In a case where the terminal is formed only at a predetermined portion, the terminal is formed by, for example, performing masking with a tape, or the like.

Hereinbefore, the embodiments of the present disclosure have been described in detail with reference to the drawings, but each configuration and combination thereof, and the like in each embodiment is an example. Additions, omissions, substitutions, and other modifications can be made without departing from the spirit of the present disclosure.

EXAMPLES

Example 1-1

134.9 g of $Li_2CO_3$ powder, 19.7 g of $Al_2O_3$ powder, 596.9 g of $TiO_2$ powder, 1328.6 g of $NH_4H_2PO_4$ powder, and 0.2 g of ZnO powder were prepared. These powders were wet mixed in a ball mill for 16 hours and then dehydrated and dried. Therefore, a powder mixture is obtained. The obtained powder mixture was sintered in air at 800° C. for 2 hours, and therefore a calcined product was obtained. Then, the obtained calcined product was subjected to wet grinding by a ball mill for 16 hours, and then dehydrated and dried, thereby obtaining a powder of a solid electrolyte.

Example 1-2

A powder of a solid electrolyte was obtained in the same manner as in Example 1-1, except that an amount of ZnO powder was 0.9 g.

Example 1-3

A powder of a solid electrolyte was obtained in the same manner as in Example 1-1, except that an amount of ZnO powder was 1.9 g.

Example 1-4

A powder of a solid electrolyte was obtained in the same manner as in Example 1-1, except that an amount of ZnO powder was 9.3 g.

Example 1-5

A powder of a solid electrolyte was obtained in the same manner as in Example 1-1, except that an amount of ZnO powder was 18.6 g.

Example 1-6

A powder of a solid electrolyte was obtained in the same manner as in Example 1-1, except that an amount of ZnO powder was 37.1 g.

Example 1-7

A powder of a solid electrolyte was obtained in the same manner as in Example 1-1, except that an amount of ZnO powder was 55.7 g.

Example 1-8

A powder of a solid electrolyte was obtained in the same manner as in Example 1-1, except that 2.1 g of CaO powder was added instead of ZnO powder.

Example 1-9

A powder of a solid electrolyte was obtained in the same manner as in Example 1-1, except that 2.5 g of MgO powder was added instead of ZnO powder.

Example 1-10

A powder of a solid electrolyte was obtained in the same manner as in Example 1-1, except that 1.9 g of CuO powder was added instead of ZnO powder.

Example 1-11

A powder of a solid electrolyte was obtained in the same manner as in Example 1-1, except that an amount of $Li_2CO_3$ powder was 119.6 g, an amount of $Al_2O_3$ powder was 9.1 g, an amount of $TiO_2$ powder was 750.0 g, an amount of $NH_4H_2PO_4$ powder was 1192.3 g, and an amount of ZnO powder was 2.0 g.

Example 1-12

A powder of a solid electrolyte was obtained in the same manner as in Example 1-1, except that an amount of $Li_2CO_3$ powder was 114.3 g, an amount of $Al_2O_3$ powder was 10.1 g, an amount of $TiO_2$ powder was 447.9 g, an amount of $NH_4H_2PO_4$ powder was 1495.5 g, and an amount of ZnO powder was 1.67 g.

Example 1-13

A powder of a solid electrolyte was obtained in the same manner as in Example 1-1, except that an amount of $Li_2CO_3$ powder was 215.8 g, an amount of $Al_2O_3$ powder was 91.9 g, an amount of $TiO_2$ powder was 676.4 g, an amount of $NH_4H_2PO_4$ powder was 1144.2 g, and an amount of ZnO powder was 2.0 g.

Example 1-14

A powder of a solid electrolyte was obtained in the same manner as in Example 1-1, except that an amount of $Li_2CO_3$ powder was 161.1 g, an amount of $Al_2O_3$ powder was 25.4 g, an amount of $TiO_2$ powder was 785.4 g, an amount of $NH_4H_2PO_4$ powder was 1123.8 g, and an amount of ZnO powder was 2.1 g.

Example 1-15

A powder of a solid electrolyte was obtained in the same manner as in Example 1-1, except that an amount of $Li_2CO_3$ powder was 80.8 g, an amount of $Al_2O_3$ powder was 7.2 g, an amount of $TiO_2$ powder was 1044.3 g, an amount of $NH_4H_2PO_4$ powder was 915.6 g, and an amount of ZnO powder was 2.4 g.

Example 1-16

A powder of a solid electrolyte was obtained in the same manner as in Example 1-1, except that an amount of $Li_2CO_3$ powder was 234.8 g, an amount of $Al_2O_3$ powder was 104.2 g, an amount of $TiO_2$ powder was 630.8 g, an amount of $NH_4H_2PO_4$ powder was 1169.9 g, and an amount of ZnO powder was 2.0 g.

Comparative Example 1-1

A powder of a solid electrolyte was obtained in the same manner as in Example 1-1, except that ZnO powder was not added.

Comparative Example 1-2

A powder of a solid electrolyte was obtained in the same manner as in Example 1-1, except that an amount of ZnO powder was 64.9 g.

Comparative Examples 1-3 to 1-8

Powders of solid electrolytes were obtained in the same manner as in Examples 1-11 to 1-16, except that ZnO powder was not added.

[Evaluation]

For each of the solid electrolyte powders obtained in the examples and comparative examples, the chemical composition, the crystal structure, the elution amount of added metallic elements by hydrochloric acid, and the lithium ionic conductance were measured by the following method. The measurement results are shown in Table 1.

(Chemical Composition)

The solid electrolyte powder was dissolved in acid. A content of Li, Al, Ti, and P in the obtained solution was measured by ICP-AES and converted into a content in the solid electrolyte powder.

(Crystal Structure)

X-ray diffraction pattern of the solid electrolyte powder was measured by a powder X-ray diffraction method. Using the obtained X-ray diffraction patterns, a crystal structure of the solid electrolyte powder was identified. A solid electrolyte powder having the same X-ray diffraction pattern as that of lithium titanium phosphate, $LiTi_2(PO_4)_3$, was taken as an LTP type.

(Elution Amount of Added Metallic Element by Hydrochloric Acid)

1 g of a solid electrolyte powder was immersed in 20 ml of 1 mol/L hydrochloric acid for 1 hour. Thereafter, the hydrochloric acid and the solid electrolyte powder were separated by filtration. The separated filtrate (hydrochloric acid) was diluted, and a content of added metallic elements (Zn, Ca, Mg, Cu) was measured by 1CP-AES to calculate an elution amount of the added metallic element. The elution amount was calculated as an amount with respect to the added metallic element contained in 1 g of the solid electrolyte powder (quantitatively determined lower limit: 1 mass ppm or less).

(Lithium Ionic Conductance)

0.5 g of a pulverized solid electrolyte powder was put into a mold having a diameter of 12 mm, cold pressed at a pressure of 2.0 t/cm$^2$, and then sintered at 800° C. for 1 hour. Therefore, a solid electrolyte sintered body was obtained. Gold electrodes were formed on both surfaces of the obtained solid electrolyte sintered body by performing gold sputtering. The ionic conductivity was measured under the condition of an amplitude of 50 mV and a frequency of 0.5 Hz to 1 MHz using an impedance measuring device.

TABLE 1

| | Chemical composition (% by mass) | | | | | | | | Crystal structure | Amount of added metallic elements eluted by hydrochloric acid | Lithium ion conductivity (S/cm) |
|---|---|---|---|---|---|---|---|---|---|---|---|
| | | | | | Added metallic element | | | | | | |
| | Li | Al | Ti | P | Zn | Ca | Mg | Cu | | | |
| Example 1-1 | 1.7 | 0.7 | 24 | 24 | 0.01 | — | — | — | LTP type | 1 mass ppm or less | 3.3 × 10$^{-4}$ |
| Example 1-2 | 1.7 | 0.7 | 24 | 24 | 0.05 | — | — | — | LTP type | 1 mass ppm or less | 5.5 × 10$^{-4}$ |
| Example 1-3 | 1.7 | 0.7 | 24 | 24 | 0.1 | — | — | — | LTP type | 1 mass ppm or less | 6.4 × 10$^{-4}$ |
| Example 1-4 | 1.7 | 0.7 | 24 | 24 | 0.5 | — | — | — | LTP type | 1 mass ppm or less | 6.2 × 10$^{-4}$ |
| Example 1-5 | 1.7 | 0.7 | 24 | 24 | 1.0 | — | — | — | LTP type | 1 mass ppm or less | 5.7 × 10$^{-4}$ |
| Example 1-6 | 1.7 | 0.7 | 24 | 24 | 2.0 | — | — | — | LTP type | 1 mass ppm or less | 5.5 × 10$^{-4}$ |
| Example 1-7 | 1.7 | 0.7 | 24 | 24 | 3.0 | — | — | — | LTP type | 1 mass ppm or less | 3.6 × 10$^{-4}$ |
| Example 1-8 | 1.7 | 0.7 | 24 | 24 | — | 0.1 | — | — | LTP type | 1 mass ppm or less | 4.3 × 10$^{-4}$ |
| Example 1-9 | 1.7 | 0.7 | 24 | 24 | — | — | 0.1 | — | LTP type | 1 mass ppm or less | 4.1 × 10$^{-4}$ |

TABLE 1-continued

| | Chemical composition (% by mass) | | | | | | | | Crystal structure | Amount of added metallic elements eluted by hydrochloric acid | Lithium ion conductivity (S/cm) |
|---|---|---|---|---|---|---|---|---|---|---|---|
| | Li | Al | Ti | P | Zn | Ca | Mg | Cu | | | |
| Example 1-10 | 1.7 | 0.7 | 24 | 24 | — | — | — | 0.1 | LTP type | 1 mass ppm or less | $3.6 \times 10^{-4}$ |
| Example 1-11 | 1.4 | 0.3 | 28 | 20 | 0.1 | — | — | — | LTP type | 1 mass ppm or less | $3.1 \times 10^{-4}$ |
| Example 1-12 | 1.6 | 0.4 | 20 | 30 | 0.1 | — | — | — | LTP type | 1 mass ppm or less | $2.9 \times 10^{-4}$ |
| Example 1-13 | 2.5 | 3.0 | 25 | 19 | 0.1 | — | — | — | LTP type | 1 mass ppm or less | $1.1 \times 10^{-4}$ |
| Example 1-14 | 1.8 | 0.8 | 28 | 18 | 0.1 | — | — | — | LTP type | 1 mass ppm or less | $1.3 \times 10^{-4}$ |
| Example 1-15 | 0.8 | 0.2 | 33 | 13 | 0.1 | — | — | — | LTP type | 1 mass ppm or less | $6.3 \times 10^{-5}$ |
| Example 1-16 | 2.8 | 3.5 | 24 | 20 | 0.1 | — | — | — | LTP type | 1 mass ppm or less | $7.4 \times 10^{-5}$ |
| Comparative Example 1-1 | 1.7 | 0.7 | 24 | 24 | — | — | — | — | LTP type | — | $8.6 \times 10^{-5}$ |
| Comparative Example 1-2 | 1.7 | 0.7 | 24 | 24 | 35 | — | — | — | LTP type | 1 mass ppm or less | $9.1 \times 10^{-5}$ |
| Comparative Example 1-3 | 1.4 | 0.3 | 28 | 20 | — | — | — | — | LTP type | — | $8.3 \times 10^{-5}$ |
| Comparative Example 1-4 | 1.6 | 0.4 | 20 | 30 | — | — | — | — | LTP type | — | $8.2 \times 10^{-5}$ |
| Comparative Example 1-5 | 2.5 | 3.0 | 25 | 19 | — | — | — | — | LTP type | — | $3.6 \times 10^{-5}$ |
| Comparative Example 1-6 | 1.8 | 0.8 | 28 | 18 | — | — | — | — | LTP type | — | $3.2 \times 10^{-5}$ |
| Comparative Example 1-7 | 0.8 | 0.2 | 33 | 13 | — | — | — | — | LTP type | — | $1.1 \times 10^{-5}$ |
| Comparative Example 1-8 | 2.8 | 3.5 | 24 | 20 | — | — | — | — | LTP type | — | $1.8 \times 10^{-5}$ |

It was confirmed that, in each of the solid electrolyte powders obtained in Examples 1-1 to 1-16 and Comparative Example 1-2, an elution amount of the added metallic element by hydrochloric acid was 1 mass ppm or less (quantitatively determined lower limit), and that the added metallic element was incorporated into the crystal of the solid electrolyte powder.

The solid electrolyte powders obtained in Comparative Examples 1-1 to 1-8 had low lithium ionic conductance. In Comparative Examples 1-1 and 1-3 to 1-8, it is presumed that lithium ionic conductance was not improved, because an amount of a divalent metallic element added was small and defect sites were not sufficiently formed inside the crystal. On the other hand, in Comparative Example 1-2, it is presumed that ionic conductance was reduced, because an amount of the divalent metallic element added was too large and a large number of defect sites were formed inside the crystal.

On the contrary, the solid electrolyte powders obtained in Examples 1-1 to 1-16 showed remarkably improved lithium ionic conductance as compared with the solid electrolyte powders obtained in Comparative Examples 1-1 to 1-8.

Based on the above results, it was confirmed that lithium ionic conductance remarkably improved in the solid electrolyte powder containing added metallic elements such as Zn, Ca, Mg, and Cu inside the crystal within a range defined in the present disclosure.

FIGS. 2A to 2D show an SEM-EDS elemental mapping of the solid electrolyte powder obtained in Example 1-4.

A brighter color tone indicates that a content of elements to be detected (FIG. 2A: BF, FIG. 2B: AlK, FIG. 2C: PK, and FIG. 2D: TiK) becomes higher.

Distribution of fine Al of 0.2 μm or less is observed on the surface of the solid electrolyte powder of about 0.5 to 2.0 μm. Since these fine powders considered to be $Al_2O_3$ were found in Examples 1-1 to 1-16 and Comparative Example 1-2 in which a divalent metal element was added, the added divalent metal element was Li It is considered that defect sites are formed inside the crystals by replacing the Al position of the Al—Ti—P—O compound.

Example 2-1

(Preparation of Paste for Forming Solid Electrolyte Layer)

As a solid electrolyte, the solid electrolyte powder obtained in Example 1-3 was used. This solid electrolyte powder was dispersed in a vehicle containing terpineol as a solvent, a non-aqueous dispersant as a dispersant, and ethyl cellulose as a binder, thereby preparing a paste for forming a solid electrolyte layer.

(Preparation of Paste for Forming Electrode Active Material Layer)

A paste for forming an electrode active material layer was prepared in the same manner as in the preparation of the paste for forming a solid electrolyte layer by using $Li_3V_2(PO_4)_3$ powder as an electrode active material.

(Preparation of Paste for Forming Current Collector Layer)

A paste for forming a current collector layer was prepared in the same manner as in the preparation of the paste for forming an electrode active material layer by using a mixed powder obtained by mixing copper powder and $Li_3V_2(PO_4)_3$ powder at a volume ratio of 80/20.

(Production of Positive Electrode Unit)

A positive electrode unit was produced using the paste for forming a solid electrolyte layer, the paste for forming an electrode active material layer, and the paste for forming a current collector layer which were prepared as described above.

First, the paste for forming a solid electrolyte layer was formed into a sheet shape on a PET film by a doctor blade method and dried, and therefore a solid electrolyte layer 3 was formed. Next, the paste for forming an electrode active material layer was printed thereon by screen printing and dried, and therefore a positive electrode active material layer 1B was formed. Next, the paste for forming a current collector layer was printed thereon by screen printing and dried, and therefore a positive electrode current collector layer 1A was formed. In addition, the paste for forming an electrode active material layer was printed thereon again by screen printing and dried, and therefore a positive electrode active material layer 1B was formed. Then, the PET film was peeled off to produce a positive electrode unit in which the solid electrolyte layer 3, the positive electrode active material layer 1B, the positive electrode current collector layer 1A, and the positive electrode active material layer 1B were laminated in this order. 26 positive electrode units were produced.

(Production of Negative Electrode Unit)

A negative electrode unit was produced using the paste for forming a solid electrolyte layer, the paste for forming an electrode active material layer, and the paste for forming a current collector layer which were prepared as described above.

First, the paste for forming a solid electrolyte layer was formed into a sheet shape on a PET film by a doctor blade method and dried, and therefore a solid electrolyte layer 3 was formed. Next, the paste for forming an electrode active material layer was printed thereon and dried, and therefore a negative electrode active material layer 2B was formed. Next, the paste for forming a current collector layer was printed thereon by screen printing and dried, and therefore a negative electrode current collector layer 2A was formed. In addition, the paste for forming an electrode active material layer was printed thereon again by screen printing and dried, and therefore a negative electrode active material layer 2B was formed. Then, the PET film was peeled off to produce a negative electrode unit in which the solid electrolyte layer 3, the negative electrode active material layer 2B, the negative electrode current collector layer 2A, and the negative electrode active material layer 2B were laminated in this order. 25 negative electrode units were produced.

(Production of Solid-State Lithium Ion Rechargeable Battery)

The positive electrode unit and the negative electrode unit which were produced as described above were alternately piled up to form a green sheet laminated body consisting of 26 positive electrode units and 25 negative electrode units. The formed laminate was simultaneously sintered after debinding at 650° C., and therefore a sintered body was obtained. A temperature of simultaneous calcination was 800° C., and a calcination time was 1 hour.

An InGa electrode paste was applied to each of the positive electrode current collector layer 1A and the negative electrode current collector layer 2A of the obtained sintered body and dried. A first external terminal 5 was attached to the positive electrode current collector layer 1A, and a second external terminal 6 was attached to the negative electrode current collector layer 2A, and therefore a solid-state lithium ion rechargeable battery was manufactured.

Comparative Example 2-1

A positive electrode unit and a negative electrode unit were manufactured in the same manner as in Example 2-1 except that the solid electrolyte powder obtained in Comparative Example 1-1 was used as a solid electrolyte. A solid-state lithium ion rechargeable battery was manufactured in the same manner as in Example 1 except that these positive electrode unit and negative electrode unit were used.

[Evaluation]

An internal resistance was measured for the solid-state lithium ion rechargeable batteries obtained in Example 2-1 and Comparative Example 2-1. As a result, the solid-state lithium ion rechargeable battery obtained in Example 2-1 had an internal resistance of 3.6 kΩ, and the solid-state lithium ion rechargeable battery obtained in Comparative Example 2-1 had an internal resistance of 18.2 kΩ. That is, an internal resistance of the solid-state lithium ion rechargeable battery obtained in Example 2-1 was confirmed to be reduced to ⅕ as compared with the solid-state lithium ion rechargeable battery obtained in Comparative Example 2-1.

The internal resistance was calculated by charging and discharging the solid-state lithium ion rechargeable battery, and dividing a difference (IR drop) between an open-circuit voltage after the pause of charging (immediately before the start of discharging) and a voltage after 1 second from the start of discharging, by a current value at the time of discharging. Charging and discharging of the solid-state lithium ion rechargeable battery was carried out at a constant current of 30 μA. A cutoff voltage during charging and discharging were 1.8 V and 0 V, respectively. In addition, a pause time after charging and after discharging was set to 1 minute.

INDUSTRIAL APPLICABILITY

An output current of the solid-state lithium ion battery can be made higher.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
4 Laminated body
5 First external terminal
6 Second external terminal
10 Solid-state lithium ion rechargeable battery

The invention claimed is:

1. A lithium ion-conducting solid electrolyte, which is a compound having a polyanion, comprising:
   at least one metallic element selected from the group consisting of Zn, Ca, Mg, and Cu within a range of 0.01% by mass to 3.0% by mass; and
   Li within a range of 1.0% by mass to 1.7% by mass, Al within a range of 0.1% by mass to 3.0% by mass, Ti within a range of 15.0% by mass to 35.0% by mass, and P within a range of 15.0% by mass to 35.0% by mass,
   wherein the metallic element is incorporated into a host crystal of the lithium ion-conducting solid electrolyte.

2. The lithium ion-conducting solid electrolyte according to claim 1, wherein a content of the metallic element is within a range of 0.05% by mass to 2.0% by mass.

3. The lithium ion-conducting solid electrolyte according to claim 1, wherein the content of Li is within a range of 1.4% by mass to 1.7% by mass, the content of Al is within a range of 0.3% by mass to 1.5% by mass, the content of Ti is within a range of 20.0% by mass to 28.0% by mass, and the content of P is within a range of 20.0% by mass to 30.0% by mass.

4. The lithium ion-conducting solid electrolyte according to claim 1, which has the same crystal structure as a compound having a NASICON-type crystal structure.

5. The lithium ion-conducting solid electrolyte according to claim 4, wherein the compound having the NASICON-type crystal structure is lithium titanium phosphate.

6. The lithium ion-conducting solid electrolyte according to claim 1, wherein the lithium titanium phosphate is a metal-substituted lithium titanium phosphate in which a part of Ti is substituted with another metal, and the metal-substituted lithium titanium phosphate is represented by a compositional formula $Li_f Mf_g Ti_h P_i O_{12}$, in the compositional formula, Mf is one kind selected from Al, Sc, In, Fe, Cr, Ga, Y, and La, f is a number satisfying $0.5 \leq f \leq 3.0$, g is a number satisfying $0.09 \leq g \leq 0.50$, h is a number satisfying $1.40 \leq h \leq 2.00$, and i is a number satisfying $2.80 \leq i \leq 3.20$.

7. The lithium ion-conducting solid electrolyte according to claim 1, wherein the metallic element substitutes a trivalent or tetravalent metal constituting the host crystal of the lithium ion-conducting solid electrolyte.

8. The lithium ion-conducting solid electrolyte according to claim 1, wherein the metallic element in a monovalent or divalent state is incorporated into the host crystal.

9. A solid-state lithium ion rechargeable battery containing the lithium ion-conducting solid electrolyte according to claim 1.

10. The solid-state lithium ion rechargeable battery according to claim 9, wherein a relative density between a pair of electrode layers and a solid electrolyte layer provided between the pair of electrode layers is 80% or more.

* * * * *